Jan. 24, 1967 E. C. RHYNE, JR., ET AL 3,300,708

POLE CHANGER TYPE FREQUENCY CONVERTER

Filed July 20, 1965 3 Sheets-Sheet 1

Jan. 24, 1967 E. C. RHYNE, JR., ET AL 3,300,708

POLE CHANGER TYPE FREQUENCY CONVERTER

Filed July 20, 1965 3 Sheets-Sheet 2

Jan. 24, 1967 E. C. RHYNE, JR., ET AL 3,300,708

POLE CHANGER TYPE FREQUENCY CONVERTER

Filed July 20, 1965 3 Sheets-Sheet 3

United States Patent Office 3,300,708

Patented Jan. 24, 1967

3,300,708

POLE CHANGER TYPE FREQUENCY CONVERTER

Earl C. Rhyne, Jr., Millis, and John Contino, South Acton, Mass., assignors to Dielectric Products Engineering Co., Inc., Littleton, Mass., a corporation of Michigan Filed July 20, 1965, Ser. No. 473,367

14 Claims. (Cl. 321—69)

The present invention relates to a pole changer type frequency converter. More particularly, the invention relates to a pole changer type frequency converter which produces a 30 cycle per second output pulse at a 60 cycle per second input signal.

The principal object of the present invention is to provide a new and improved frequency converter.

An object of the present invention is to provide a frequency converter which is unusually simple in structure yet is efficient and reliable in operation.

Another object of the present invention is to provide a new and improved 30 cycle frequency converter.

Another object of the present invention is to provide a 30 cycle frequency converter utilizing transistors.

Another object of the present invention is to provide a 30 cycle frequency converter utilizing silicon controlled rectifiers.

In accordance with the present invention, a frequency converer for converting an input signal having a determined frequency to an output signal having half the determined frequency comprises a transformer having a primary winding and a secondary winding. An input signal having a determined frequency of periodic waveshape is provided by an input source. A switching arrangement is connected between the input source and selected points on the primary winding of the transformer and is selectively controlled by the input signal and by the magnetic conditions of the core of the transformer to provide in the primary winding of the transformer a half the determined frequency signal having only a positive portion of half cycle duration for every other full cycle of the input signal commencing with one of the first and second cycle of the input signal and only a negative portion of half cycle duration for every other full cycle of the input signal commencing with the other of the first and second cycle of the input signal. An output connected to the secondary winding of the transformer provides the half the determined frequency signals.

In order that the invention may be readily carried into effect, it will now be described with reference to the accompanying drawings, wherein.

Figure 1:
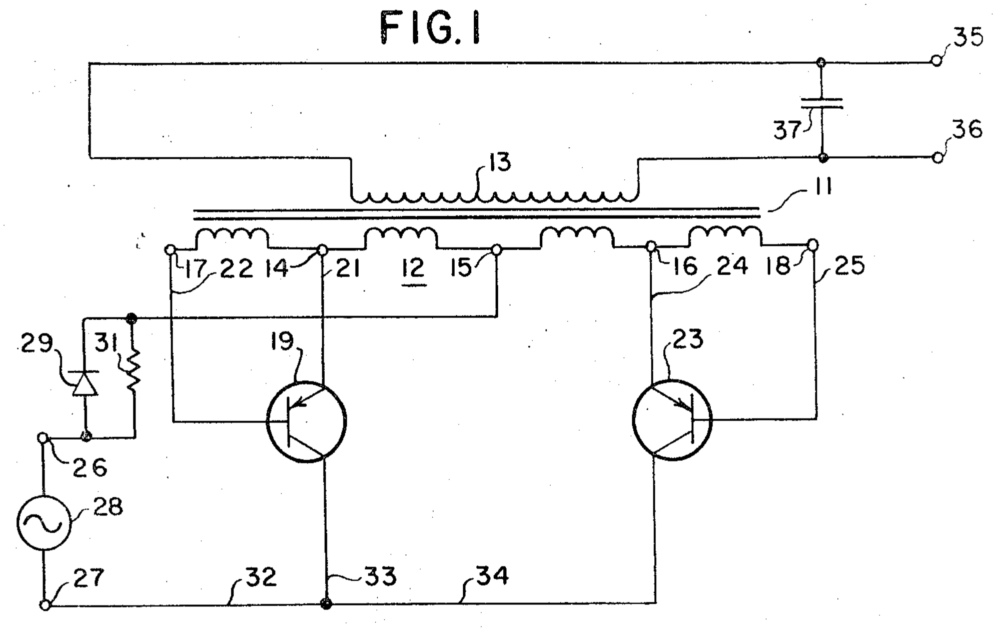
FIG. 1 is a circuit diagram of an embodiment of a frequency converter of the present invention.

In FIG. 1, a transformer 11 has a core, a primary winding 12 and a secondary winding 13. The primary winding 12 has tap points or taps 14, 15 and 16 and end points or terminals 17 and 18. A first transistor 19 of pnp type has an emitter electrode connected to the tap point 14 of the primary winding 12 via a lead 21, a base electrode connected to the end point 17 of said primary winding via a lead 22, and a collector electrode. A second transistor 23 of pnp type has an emitter electrode connected to the tap point 16 of the primary winding 12 via a lead 24, a base electrode connected to the end point 18 of said primary winding via a lead 25, and a collector electrode.

Figure 2:
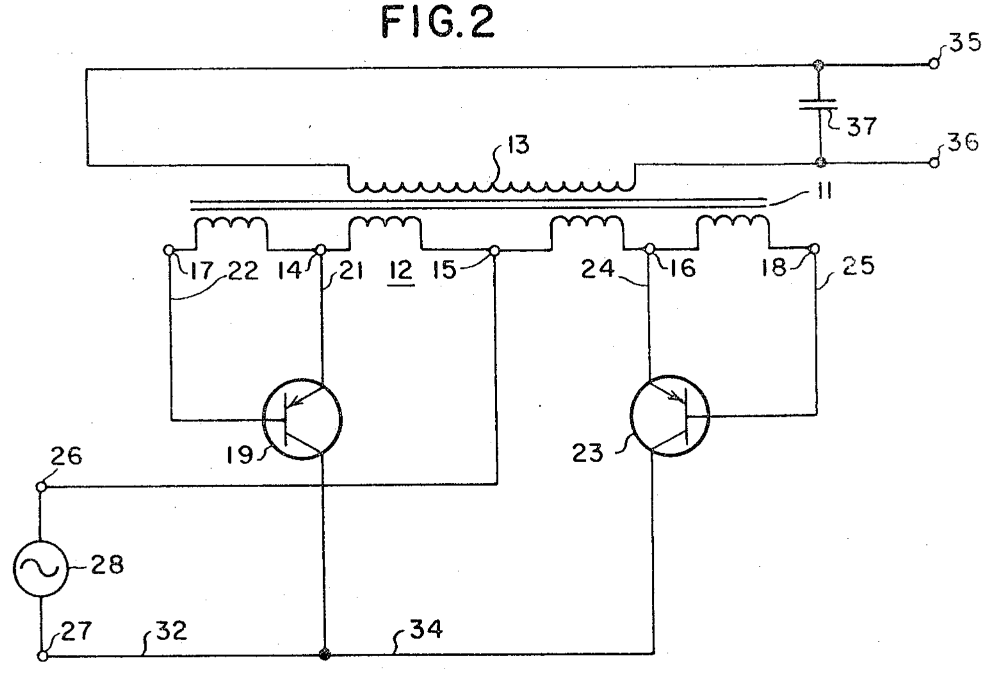
FIG. 2 is a circuit diagram of a modification of the embodiment of FIG. 1.
Figure 3:
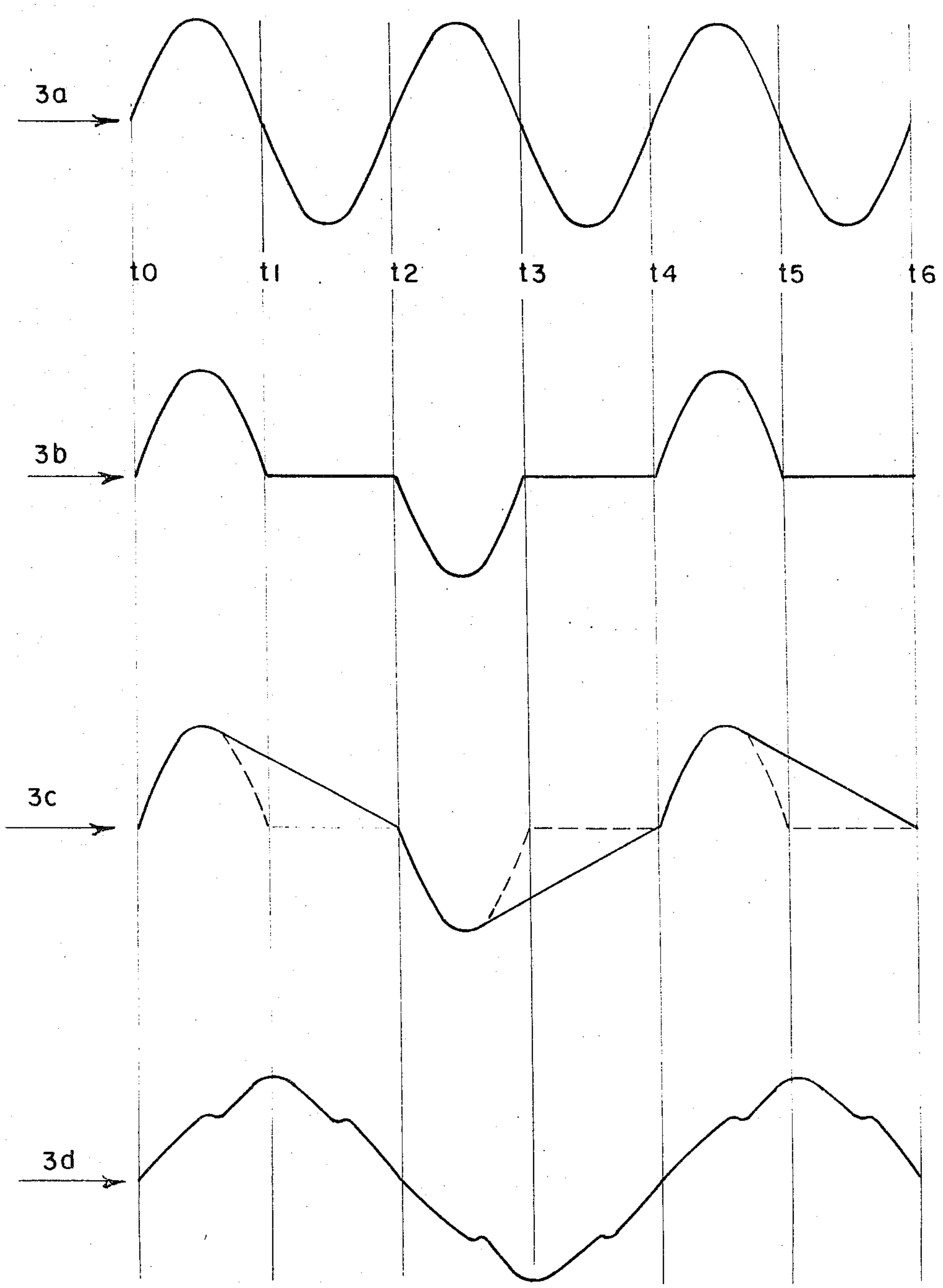
FIG. 3 is a graphical presentation of input and output waveforms of the embodiments of FIGS. 1, 4 and 5.

An A.C. input wave of periodic shape is supplied at input terminals 26 and 27 from a source of A.C. voltage 28. The A.C. input signal is shown in FIG. 3*a*. The input terminal 26 may be connected directly to the tap point 15 of the primary winding 12, as shown in FIG. 2, or it may be connected to said tap point via an input control circuit comprising a rectifier 29 and a resistor 31 connected in parallel with said rectifier, as shown in FIG. 1. The input terminal 27 is connected to the collector electrode of the first transistor 19 via leads 32 and 33 and to the collector electrode of the second transistor 23 via leads 32 and 34.

One end point or terminal of the secondary winding 13 is connected to an output terminal 35 and the other end point or terminal of said winding is connected to an output terminal 36. A capacitor 37 is connected across the output terminals 35 and 36 and functions as a filter. Of course, transistors of npn type may be utilized instead of pnp type transistors.

The input signal supplied to the input terminals 26 and 27, as illustrated in FIG. 3*a*, is a periodic waveform. FIGS. 3*a*, 3*b*, and 3*c* are all illustrated on the same time scale, so that in each of these figures the first half of the first cycle extends from time *t*0 to time *t*1, the second half of the first cycle extends from time *t*1 to time *t*2, the first half of the second cycle extends from time *t*2 to time *t*3, the second half of the second cycle extends from time *t*3 to time *t*4, the first half of the third cycle extends from time *t*4 to time *t*5, and the second half of the third cycle extends from time *t*5 to time *t*6.

As shown in FIG. 3*a*, the input signal is assumed to be positive during the first half cycle of each of the first, second and third cycles and negative during the second half cycle of each of the first, second and third cycles.

When the polarity of the input signal at the input terminal 26 is positive and the polarity of said input signal at the input terminal 27 is negative and the transistor 19 is conducting, the polarity at the tap point 17 is negative so that a negative bias is impressed upon the base electrode of the transistor 19, the polarity at the tap point 14 is positive with respect to the tap point 17 so that a positive bias is impressed upon the emitter electrode of the transistor 19, while the polarity at the collector electrode of the transistor 19 is negative. The transistor 19 is thus kept conductive during the first half of the first cycle and produces the waveform illustrated in FIG. 3*b* in the time period *t*0 to *t*1 during the first half of the first cycle.

When the polarity of the input signal at the input terminal 26 is positive and the polarity of said input signal at the input terminal 27 is negative, the polarity at the tap point 18 is positive so that a positive bias is impressed upon the base electrode of the transistor 23, the polarity at the tap point 16 is negative with respect to the tap point 18 so that a negative bias is impressed upon the emitter electrode of the transistor 23, while the polarity at the collector of the transistor 23 is negative. The transistor 23 is thus kept nonconductive during the first half of the first cycle and does not contribute to the output waveform as illustrated in FIG. 3*b*.

During the second half of the first cycle, when the polarity of the input signal at the input terminal 26 is negative and the polarity of said input signal at the input terminal 27 is positive, the input control circuit 29, 31 blocks the input signal and makes both transistors 19 and 23 nonconductive. The output waveform is thus zero during the second half of the first cycle, as shown in FIG. 3*b* in the time period *t*1 to *t*2.

If the input control circuit 29, 31 is eliminated, as in the modification of FIG. 2, and the input terminal 26 is connected directly to the tap point 15, during the second half of the first cycle, when the polarity of the input signal at the input terminal 26 is negative and the polarity of said input signal at the input terminal 27 is positive, both transistors 19 and 23 are made conductive. This is due to the symmetrical conductive effect in which the collector electrode functions substantially as the emitter and the emitter electrode functions substantially as the collector. The polarity at the tap points 14 and 16 is negative so that a negative bias is impressed upon the emitter electrodes of the transistors 19 and 23. The polarity of the tap points 17 and 18 is negative so that a negative bias is impressed upon the base electrodes of the transistors 19 and 23. The polarity at the collector electrodes of the transistors 19 and 23 is positive.

Due to the symmetrical conductive effect, the emitter of each of the transistors 19 and 23 will function as its collector and the collector of each of said transistors will function as its emitter, so that both said transistors will be biased in their conductive condition and will be made conductive. The emitter of each of the transistors 19 and 23, which functions as the collector, is tied directly to the base of the corresponding transistor and makes the corresponding transistor conductive. The primary function of the input control circuit 29, 31 is to prevent a short circuit effect when both transistors 19 and 23 are conductive.

The effect on the output waveform shown in FIG. 3*b* is the same when both transistors 19 and 23 are in conductive condition as when both transistors are in nonconductive condition. Thus, during the second half of the first cycle there is a zero output because there is no voltage difference produced in the primary winding 12 of the transformer 11. During the time period *t1* to *t2*, therefore, the current flow into the frequency converter is limited only by the input impedance, the impedance of the transistors and the impedance of the transformer.

During the first half of the second cycle, which is the period *t2* to *t3*, the polarity of the input signal at the input terminal 26 is again positive and the polarity of said input signal at the input terminal 27 is again negative. The core of the transformer 11 is driven to a specific magnetic condition. Due to the permeability condition of the core of the transformer 11, the prevalent polarities evident at the tap points during the period *t0* to *t1* of the first half of the first cycle are reversed during the period *t2* to *t3* of the first half of the second cycle. Thus, the polarity at the tap point 17 is positive so that a positive bias is impressed upon the base electrode of the transistor 19, the polarity at the tap point 14 is negative so that a negative bias is impressed upon the emitter electrode of the transistor 19, and the polarity at the collector electrode of the transistor 19 is negative. The transistor 19 is thus made nonconductive during the first half of the second cycle and does not contribute to the output waveform as illustrated in FIG. 3*b*.

Furthermore, due to the aforementioned polarity reversal, the polarity at the tap point 18 is negative so that a negative bias is impressed upon the base electrode of the transistor 23, the polarity at the tap point 16 is positive so that a positive bias is impressed upon the emitter electrode of the transistor 23, and the polarity at the collector electrode of the transistor 23 is negative. The transistor 23 is thus made conductive during the first half of the second cycle and produces the waveform illustrated in FIG. 3*b* in the time period *t2* to *t3* during the first half of the second cycle.

During the second half of the second cycle, when the polarity of the input signal at the input terminal 26 is negative and the polarity of said input signal at the input terminal 27 is positive, the input control circuit 29, 31 again blocks the input signal and makes both transistors 19 and 23 nonconductive. The output waveform is thus again zero during the second half of the second cycle, as shown in FIG. 3*b* in the time period *t3* to *t4*.

If the input control circuit 29, 31 is eliminated and the input terminal 26 is connected directly to the tap point 15, during the second half of the second cycle, when the polarity of the input signal at the input terminal 26 is negative and the polarity of said input signal at the input terminal 27 is positive, both transistors are made conductive in the same manner as during the second half of the first cycle.

The capacitor 37 provides an output waveform as illustrated in FIG. 3*c* at the output terminals 35 and 36. This is due to the filtering action of the capacitor 37, which instead of the positive going pulse in the first half of every odd numbered cycle and the negative going pulse in the first half of every even numbered cycle, smoothes the output waveform to a signal having a frequency which is half that of the input signal. Thus, if the input signal illustrated in FIG. 3*a* has a frequency of 60 cycles per second, the output signal illustrated in FIG. 3*c* has a frequency of 30 cycles per second. The output signal shown in FIG. 3*c* is of periodic waveshape; the waveshape of FIG. 3*b* being shown in FIG. 3*c* in broken lines for comparison purposes. Of course, if the relatively sharper pulses of FIG. 3*b* are desired instead of the waveshape of FIG. 3*c*, the filter capacitor 37 may be dispensed with.

During the first half of the third cycle, which is the period *t4* to *t5*, the frequency converter functions in the same manner as it does during the first half of the first cycle and the operation is repeated at the beginning of every odd numbered cycle. During the second half of the third cycle, which is the period *t5* to *t6*, the frequency converter functions in the same manner as it does during the second half of the first cycle. During the first half of the fourth cycle, not shown in the figures, the frequency converter functions in the same manner as it does during the first half of the second cycle. During the second half of the fourth cycle, not shown in the figures, the frequency converter functions in the same manner as it does during the second half of the second cycle. Thus, the output waveform is the same for the third and fourth cycles as it is for the first and second cycles and it is the same for the fifth and sixth cycles and for the seventh and eighth cycles and for the ninth and tenth cycles, and so on.

Figure 4:
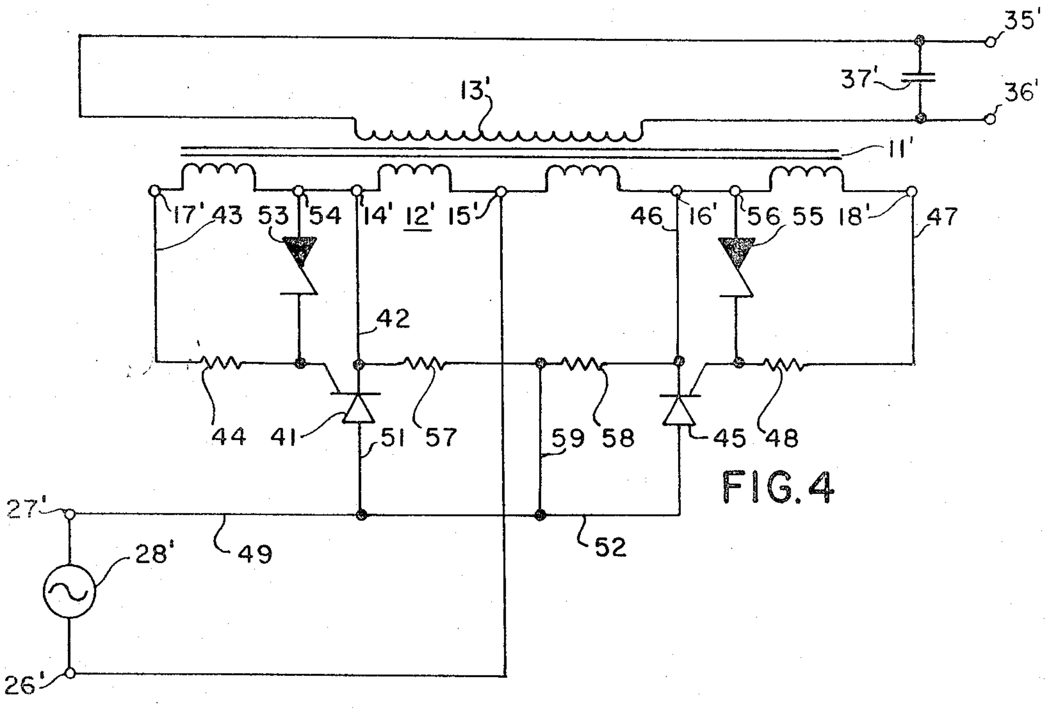
FIG. 4 is a circuit diagram of another embodiment of the frequency converter of the present invention.

FIG. 4 is a circuit diagram of another embodiment of the frequency converter of the present invention. In FIG. 4, a transformer 11' has a core, a primary winding 12' and a secondary winding 13'. The primary winding 12' has tap points or taps 14', 15' and 16' and end points or terminals 17' and 18'. A first silicon controlled rectifier or SCR 41 has a cathode connected to the tap point 14' of the primary winding 12' via a lead 42, a control electrode or gate connected to the end point 17' of said primary winding via a lead 43 and a resistor 44, and an anode. A second silicon controlled rectifier or SCR 45 has a cathode connected to the tap point 16' of the primary winding 12' via a lead 46, a control electrode or gate connected to the end point 18' of said primary winding via a lead 47 and a resistor 48, and an anode.

An A.C. input wave of periodic shape is supplied at input terminals 26' and 27' from a source of A.C. voltage 28'. The A.C. input signal is shown in FIG. 3*a*. The input terminal 26' is connected directly to the tap point 15' of the primary winding 12'. The input terminal 27' is connected to the anode of the first SCR 41 via leads 49 and 51 and to the anode of the second SCR 45 via leads 49 and 52.

One end point or terminal of the secondary winding 13' is connected to an output terminal 35' and the other end point or terminal of said winding is connected to an output terminal 36'. A capacitor 37' is connected across the output terminals 35' and 36' and functions as a filter.

The embodiment of FIG. 4 functions in the same manner as the embodiment of FIGS. 1 and 2. The principal distinction between the embodiments of FIGS. 1 and 4, aside from the utilization of SCR's in the embodiment of FIG. 4 instead of the transistors of FIG. 1, is that the input voltage applied to the transistors is considerably lower than the voltage applied to the inputs of the SCR's. A considerably higher voltage is required to fire an SCR than the voltage required to make a transistor conductive. This is especially the case when the SCR's are to be fired early in each cycle as is done in the frequency converter of the present invention.

In order to enable the application of a large voltage across the end points 17' and 18' of the primary winding 12' of the transformer 11' without exceeding the rated voltage for the control electrode of each of the first and second SCR's 41 and 45, Zener diodes are utilized. A first Zener diode 53 is connected between a point 54 on the primary winding 12' of the transformer 11' and the control electrode of the first SCR 41 and a second Zener diode 55 is connected between a point 56 on said primary winding and the control electrode of the second SCR 45. Resistors 57 and 58 are connected in series between the leads 42 and 46 which connect the first and second SCR's 41 and 45 to the tap points 14' and 16', respectively. The input terminal 27' is directly connected to the resistors 57 and 58 via the lead 49 and a lead 59.

The input signal supplied to the input terminals 26' and 27' is the same as that supplied to the input terminals 26 and 27 of the embodiment of FIG. 1. When the polarity of the input signal at the input terminal 26' is positive and the polarity of said input signal at the input terminal 27' is negative, the polarity at the tap point 17' is negative and the polarity at the control electrode of the first SCR 41 is positive and the magnitude of the current supplied to said control electrode is sufficient to fire said first SCR, the polarity at the tap point 14' is positive, and the polarity at the other electrode of the said first SCR is negative. The first SCR 41 is thus made conductive during the first half of the first cycle and produces the waveform illustrated in FIG. 3*b* in the time period *t*0 to *t*1 during the first half of the first cycle.

When the polarity of the input signal at the input terminal 26' is positive and the polarity of said input signal at the input terminal 27' is negative. The polarity at the tap point 18' is positive and the polarity at the control electrode of the second SCR 45 is negative, the polarity at the tap point 16' is negative, and the polarity at the anode of the said second SCR is negative. The second SCR is thus made nonconductive during the first half of the first cycle and does not contribute to the output waveform as illustrated in FIG. 3*b*.

During the second half of the first cycle, when the polarity of the input signal at the input terminal 26' is negative and the polarity of said input signal at the input terminal 27' is positive, both SCR's are reversed biased and therefore cannot be made conductive. This is due to the fact that, unlike a transistor, an SCR is an asymmetrical device. The output waveform is thus zero during the second half of the first cycle, as shown in FIG. 3*b* in the time period *t*1 to *t*2.

During the first half of the second cycle, which is the period *t*2 to *t*3, the polarity of the input signal at the input terminal 26' is again positive and the polarity of said input signal at the input terminal 27' is again negative. The core of the transformer 11' is driven to another specific magnetic condition. Due to the permeability condition of the core of the transformer 11', the prevalent polarities evident at the tap points during the period *t*0 to *t*1 of the first half of the first cycle are reversed during the period *t*2 to *t*3 of the first half of the second cycle. Thus, the polarity at the tap point 17' is positive and the polarity at the control electrode of the first SCR 41 is negative, the polarity at the tap point 14' is negative, and the polarity at the anode of said first SCR is negative. The first SCR 41 is thus made nonconductive during the first half of the second cycle and does not contribute to the output waveform as illustrated in FIG. 3*b*.

Furthermore, due to the aforementioned polarity reversal, the polarity at the tap point 18' is negative and the polarity at the control electrode of the second SCR 45 is positive and the magnitude of the current supplied to said control electrode is sufficient to fire said second SCR, the polarity at the tap point 16' is positive, and the polarity at the anode of the said second SCR is negative. The second SCR 45 is thus made conductive during the first half of the second cycle and produces the waveforms illustrated in FIG. 3*b* in the time period *t*2 to *t*3 during the first half of the second cycle.

During the second half of the second cycle, when the polarity of the input signal at the input terminal 26' is negative and the polarity of said input signal at the input terminal 27' is positive, both SCR's are reversed biased and therefore cannot be made conductive. The output waveform is thus again zero during the second half of the second cycle, as shown in FIG. 3*b* in the time period *t*3 to *t*4.

The capacitor 37' functions in the manner of the capacitor 37 of the embodiment of FIG. 1 to provide the output waveform illustrated in FIG. 3*c*. The embodiment of FIG. 4 functions in the same manner as the embodiment of FIG. 1 to produce the same output waveform.

Figure 5:
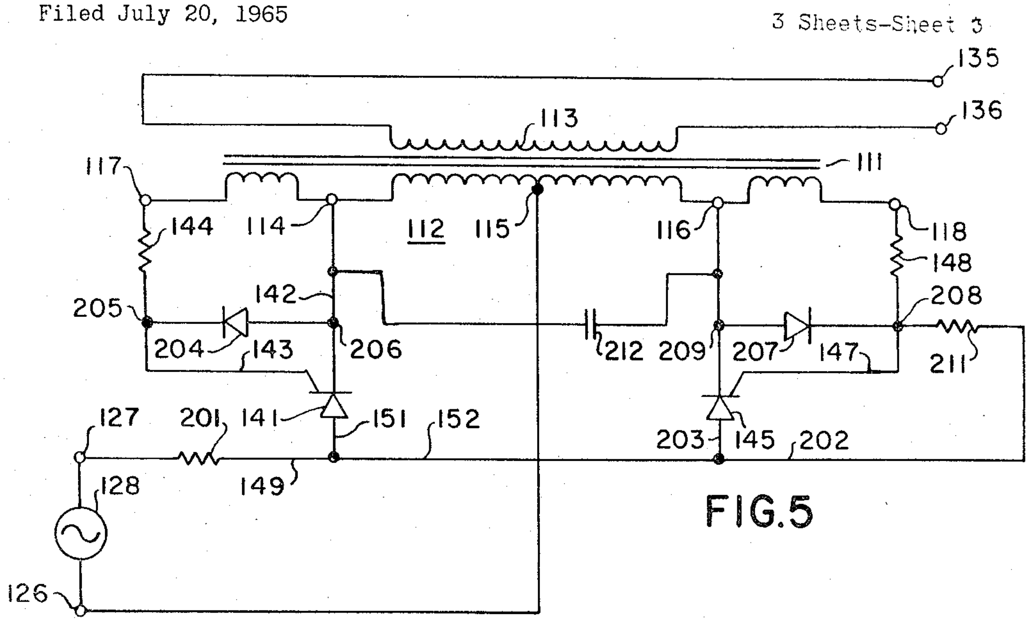
FIG. 5 is a modification of the embodiment of FIG. 4.

FIG. 5 is a modification of the embodiment of the frequency converter of FIG. 4. The principal modifications of the frequency converter illustrated in FIG. 5 are the provision of an air gap to the transformer so that its leakage reactance would be high, the addition of a capacitor connected to be in resonance with the transformer leakage reactance at 30 cycles per second and the addition of a resistor in the input line.

In FIG. 5, an A.C. input wave of the shape shown in FIG. 3*a* is provided by an A.C. source 128 and is applied to input terminals 126 and 127 to which said A.C. source is connected. The input signal is fed through a resistor 201 to the circuit via leads 149, 152 and 202. A transformer 111 has a core, a primary winding 112 and a secondary winding 113. The primary winding 112 has tap points or taps 114, 115 and 116 and end points or terminals 117 and 118.

In FIG. 5, a first SCR 141 has a cathode connected to the tap point 114 of the primary winding 112 via a lead 142, a control electrode or gate connected to the end point 117 of said primary winding via a lead 143 and a resistor 144, and an anode. A second SCR 145 has a cathode connected to the tap point 116 of the primary winding 112 via a lead 146, a control electrode or gate connected to the end point 118 of said primary winding via a lead 147 of a resistor 148, and an anode.

The input terminal 126 is connected directly to the tap point 115 of the primary winding 112. The input terminal 127 is connected to the anode of the first SCR 141 via the resistor 201 and leads 149 and 151 and to the anode of the second SCR 145 via leads 149, 152 and 203. One end point or terminal of the second winding 113 is connected to an output terminal 135 and the other end point or terminal of said winding is connected to an output terminal 136.

A first diode 204 is connected between a point 205 in the lead 143 and a point 206 in the lead 142; the cathode of said first diode being connected to the point 205 and the anode of said first diode being connected to the point 206. A second diode 207 is connected between a point 208 in the lead 147 and a point 209 in the lead 146; the cathode of said second diode being connected to the point 208 and the anode of said second diode being connected to the point 209. The input terminal 127 is connected to the cathode of the second diode 207 and to the gate of the second SCR 145 via the leads 149, 152, 202, a resistor 211 and the point 208.

The modification of FIG. 5 functions in essentially the same manner as the embodiment of FIG. 4. The resistor 201 functions as a starting resistor and the resistors 144 and 148 function as gate limit resistors.

When the polarity of the A.C. input voltage is such that the SCR's 141 and 145 are reversed biased, no conduction can occur. When the polarity of the A.C. input voltage is such that either or both of the SCR's can conduct, the circuit of FIG. 5 operates as follows.

Since the resistor 211 is connected between the anode and gate of the second SCR 145 it provides the conductive bias to the gate signal and thus said second SCR is fired before the first SCR 141, at the first suitable alternation, or positive half cycle, following the closing of the circuit. As soon as the second SCR 145 is fired, the polarities of the transformer primary winding 112 are such that the polarities at the points 116 and 118 continue the second SCR 145 in conduction. That is, the polarity at the points 116 and 118 is such as to maintain the second SCR 145 conductive and the polarity at the points 114 and 117 is such as to maintain the first SCR 141 nonconductive.

The second SCR 145 remains conductive until the end of the first positive half cycle. A capacitor 212 is connected between the leads 142 and 146 and is thus shunted across that portion of the primary winding 112 between the tap points 114 and 116. During the first positive half cycle, the capacitor 212 charges, so that at the end of the first positive half cycle, the capacitor 212 has charged and the exciting current fed to the transformer 111 reaches its maximum value.

Near the end of the first positive half cycle, there is a sufficient amount of stored energy in the leakage reactance of the transformer 111 and the capacitor 212 to sustain the polarity of said transformer for the remainder of the positive half cycle.

At the next positive half cycle, the input voltage begins to rise in value and the stored energy of the capacitor 212 and the leakage reactance of the transformer cause the output waveshape, as shown in FIG. 3*d*, to pass through zero at the time *t*2. At the time *t*2, the oscillator operation becomes negative and the first SCR 141 is fired and becomes conductive, due to the stored energy in the capacitor 212, transformer tank circuit, and the second SCR 145 is made nonconductive. Since the energy in the tank circuit is oscillatory, the polarity of the transformer and capacitor changes at approximately 30 cycles per second, so that at the second positive half cycle of the input voltage, the polarities are suitable for making the first SCR conductive and for making the second SCR 145 nonconductive.

Since the SCR's must be fired very early in the cycle, the magnitude of the gate signal voltage must be sufficient to reach approximately 2 volts very early in the cycle. In order to protect the SCR's from excessive voltage, the diodes 204 and 207 are connected across the gate-cathode circuits of said SCR's. Thus, the diode 204 is connected between the gate and the cathode of the first SCR 141 via the points 205 and 206 and the leads 143 and 142, and the diode 207 is connected between the gate and the cathode of the second SCR 145 via the points 208 and 209 and the leads 147 and 146. The diodes 204 and 207 function to clip the voltage in the reverse direction to a value of approximately 0.6 volt. In the positive direction, the gate of each of the SCR's is fed via a resistor so that the current and voltage are limited by the diode action of SCR itself; the first SCR 141 being fed via the resistor 144 and the second SCR 145 being fed via the resistor 148.

The volt-second integral of one cycle of input voltage is more than sufficient to saturate the transformer 111. The resistor 201 is utilized to limit the input current to a reasonable value and to maintain the transformer flux above the knee of the saturation curve of the core thereof.

When the transformer flux is maintained above the knee of the saturation curve, the transformer 111 functions as a coarse regulating device. That is, as the input voltage increases in value the exciting current increases disproportionately. This increases the voltage drop across the resistor 201 to a gerater extent than the increase in the input voltage so that the transformer 111 remains at the knee of the saturation curve of its core. The output voltage of the transformer 111 thus remains relatively constant insofar as the knee of the core saturation curve remains relatively constant.

The resistor 201 provides the transformer 111 regulation and is not essential to the desired operation of the circuit of FIG. 5. If the input voltage were reduced to a value which did not permit the saturation of the transformer 111, the circuit would operate without the resistor 201 and the waveshapes would still be as desired. The output waveshape of the circuit of FIG. 5, is shown in FIG. 3*d*.

While the invention has been described by means of specific examples and in specific embodiments, I do not wish to be limited thereto, for obvious modifications will occur to those skilled in the art without departing from the spirit and scope of the invention.

We claim:

1. A frequency converter for converting an input signal having a determined frequency to an output signal having half said determined frequency, comprising transformer means having a core, primary winding means and secondary winding means;

input means for supplying an input signal having a determined frequency of periodic waveshape;

switching means connected between said input means and selected points on the primary winding means of said transformer means, said switching means being selectively controlled by said input signal and by the magnetic condition of the core of said transformer means to provide in said primary winding means a half said determined frequency signal having only a positive portion of half cycle duration for every other full cycle of the input signal commencing with one of the first and second cycle of said input signal and only a negative portion of half cycle duration for every other full cycle of said input signal commencing with the other of the first and second cycle of said input signal; and output means connected to the secondary winding means of said transformer means for providing said half said determined frequency signal.

2. A frequency converter as claimed in claim 1, wherein said switching means comprises first and second switching means each having a control electrode for determining its conductive condition and the control electrode of each of said first and second switching means is connected to said input means through a selected portion of the primary winding means of said transformer means.

3. A frequency converter as claimed in claim 1, wherein said switching mean comprises first and second switching means each having a conductive condition in which it conducts current and a nonconductive condition in which it blocks current, a control electrode for determining its conductive condition connected to said input means through a selected portion of the primary winding means of said transformer means, a first electrode connected to said input means and a second electrode connected to a selected point on the primary winding means of said transformer means, and wherein both of said first and second switching means are in their nonconductive condition for a duration of half a cycle for every full cycle of the input signal to provide a half cycle zero signal for every full cycle of said input signal in said half said determined frequency signal.

4. A frequency converter as claimed in claim 2, further comprising an input control circuit connected between said input means and said switching means for blocking current to said first and second switching means during the second half of the full cycle of the input signal.

5. A frequency converter as claimed in claim 2, further comprising a filter capacitor connected across the secondary winding means of said transformer means for smoothing the positive and negative portions of said half said determined frequency signal.

6. A frequency converter for converting an input signal having a determined frequency to an output signal having half said determined frequency, comprising transformer means having a core, primary winding means and secondary winding means;

input means for supplying an input signal having a determined frequency of periodic waveshape;

transistor switching means connected between said input means and selected points on the primary winding means of said transformer means, said transistor switching means being selectively controlled by said input signal and by the magnetic condition of the core of said transformer means to provide in said primary winding means a half said determined frequency signal having only a positive portion of half cycle duration for every other full cycle of the input signal commencing with one of the first and second cycle of said input signal and only a negative portion of half cycle duration for every other full cycle of said input signal commencing with the other of the first and second cycle of said input signal; and output means connected to the secondary winding means of said transformer means for providing said half said determined frequency signal.

7. A frequency converter as claimed in claim 6, wherein said transistor switching means comprises first and second transistors each having a conductive condition in which it conducts current and a nonconductive condition in which it blocks current, a base electrode for determining its conductive condition connected to said input means through a selected portion of the primary winding means of said transformer means, a collector electrode connected to said input means and an emitter electrode connected to a selected point on the primary winding means of said transformer means, and wherein both of said first and second transistors are in their nonconductive condition for a duration of half a cycle for every full cycle of the input signal to provide a half cycle zero signal for every full cycle of said input signal in said half said determined frequency signal.

8. A frequency converter for converting an input signal having a determined frequency to an output signal having half said determined frequency, comprising transformer means having a core, primary winding means and secondary winding means;

input means for supplying an input signal having a determined frequency of periodic waveshape;

silicon controlled rectifier switching means connected between said input means and selected points on the primary winding means of said transformer means, said silicon controlled rectifier switching means being selectively controlled by said input signal and by the condition of saturation of the core of said transformer means to provide in said primary winding means a half said determined frequency signal having only a positive portion of half cycle duration for every other full cycle of the input signal commencing with one of the first and second cycle of said input signal and only a negative portion of half cycle duration for every other full cycle of said input signal commencing with the other of the first and second cycle of said input signal; and output means connected to the secondary winding means of said transformer means for providing said half said determined frequency signal.

9. A frequency converter as claimed in claim 8, wherein said silicon controlled rectifier switching means comprises first and second silicon controlled rectifiers each having a conductive condition in which it conducts current and a non-conductive condition in which it blocks current, a control electrode for determining its conductive condition connected to said input means through a selected portion of the primary winding means of said transformer means, an electrode connected to said input means and an electrode connected to a selected point on the primary winding means of said transformer means, and wherein both of said silicon controlled rectifiers are in their nonconductive condition for a duration of half a cycle for every full cycle of the input signal to provide a half cycle zero signal for every full cycle of said input signal in said half said determined frequency signal.

10. A frequency converter as claimed in claim 9, further comprising a first Zener diode connected between a selected point on the primary winding means of said transformer means and the control electrode of said first silicon controlled rectifier and a second Zener diode connected between a selected point on said primary winding means and the control electrode of said second silicon controlled rectifier.

11. A frequency converter for converting an input signal having a determined frequency to an output signal having half said determined frequency, comprising transformer means including winding means;

switching means coupled to selected points on the winding means of said transformer means, said switching means being selectively controlled by said winding means to provide in said winding means a half said determined frequency signal having only a positive portion of half cycle duration for every other full cycle of the input signal commencing with one of the first and second cycles of said input signal and only a negative portion of half cycle duration for every other full cycle of said input signal commencing with the other of the first and second cycles of said input signal; and output means in operative proximity with the winding means of said transformer means for providing said half said determined frequency signal.

12. A frequency converter as claimed in claim 1, wherein said transformer means is provided with an air gap and said frequency converter further comprises a filter capacitor connected across the secondary winding of said transformer means.

13. A frequency converter as claimed in claim 1, further comprising current limiting impedance means connected between said input means and said switching means.

14. A frequency converter as claimed in claim 1, wherein said transformer means is provided with an air gap and said frequency converter further comprises a filter capacitor connected across the secondary winding of said tarnsformer means, and further comprises current limiting impedance means connected between said input means and said switching means.

References Cited by the Examiner

UNITED STATES PATENTS

| | | | |
|---|---|---|---|
| 2,349,810 | 5/1944 | Cook | 328—136 |
| 3,076,924 | 2/1963 | Manteuffel | 323—22 |

FOREIGN PATENTS

| | | |
|---|---|---|
| 940,669 | 10/1963 | Great Britain. |

JOHN F. COUCH, *Primary Examiner.*

G. GOLDBERG, *Assistant Examiner.*